(12) United States Patent
Wilke et al.

(10) Patent No.: US 10,546,617 B2
(45) Date of Patent: Jan. 28, 2020

(54) ALTERNATELY SHAPED BACKPLANE FOR RECEIVING ELECTRICAL COMPONENTS

(71) Applicant: Western Digital Technologies, Inc., San Jose, CA (US)

(72) Inventors: Jeffrey D. Wilke, Palmer Lake, CO (US); David W. Niss, Boulder, CO (US); Toshiki Hirano, San Jose, CA (US); Lidu Huang, Danville, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 68 days.

(21) Appl. No.: 15/818,049

(22) Filed: Nov. 20, 2017

(65) Prior Publication Data

US 2019/0156866 A1    May 23, 2019

(51) Int. Cl.
*G11B 33/12* (2006.01)
*G11B 33/08* (2006.01)
*G06F 1/18* (2006.01)

(52) U.S. Cl.
CPC ............ *G11B 33/128* (2013.01); *G06F 1/187* (2013.01); *G11B 33/08* (2013.01)

(58) Field of Classification Search
USPC .......................................................... 361/788
See application file for complete search history.

(56) References Cited

U.S. PATENT DOCUMENTS

| | | |
|---|---|---|
| 2,272,807 A | 2/1942 | Kronheim |
| 4,841,100 A | 6/1989 | Ignasiak |
| 5,761,031 A | 6/1998 | Ajmani |
| 5,995,365 A | 11/1999 | Broder et al. |
| 6,084,768 A | 7/2000 | Bolognia |
| 6,166,901 A | 12/2000 | Gamble et al. |
| 6,209,842 B1 | 4/2001 | Anderson et al. |
| 6,233,143 B1 | 5/2001 | Gamble et al. |
| 6,249,432 B1 | 6/2001 | Gamble et al. |
| 6,288,902 B1 | 9/2001 | Kim et al. |
| 6,371,433 B2 | 4/2002 | Anderson et al. |
| 6,501,644 B1 | 12/2002 | Silverman et al. |
| 6,592,387 B2 | 7/2003 | Komenda et al. |
| 6,987,674 B2 | 1/2006 | El-Batel et al. |
| 7,009,835 B2 | 3/2006 | Desai et al. |
| 7,036,783 B2 | 5/2006 | Chen et al. |
| 7,492,585 B2 | 2/2009 | Zhang et al. |

(Continued)

OTHER PUBLICATIONS

International Search Report and Written Opinion of the International Searching Authority for International Application No. PCT/US2018/052752 dated Jan. 15, 2019, 10 pages.

(Continued)

*Primary Examiner* — Andargie M Aychillhum

(57) ABSTRACT

Provided herein are systems and apparatus for reducing vibration interaction between hard drives. In one implementation, an apparatus is provided comprising a backplane that comprises a substrate comprising an at least partially flexible material and a connector island assembly formed in the substrate. The connector island assembly comprises a spring element and a connector island. The spring element extends from a main portion of the substrate, and the connector island extends from the spring element. The connector island assembly is surrounded by the main portion of the substrate and configured to flex independently of the main portion of the substrate.

20 Claims, 7 Drawing Sheets

(56) References Cited

U.S. PATENT DOCUMENTS

| | | | |
|---|---|---|---|
| 7,515,407 B2 | 4/2009 | Goodman et al. | |
| 7,679,896 B2 | 3/2010 | Deng et al. | |
| 8,077,578 B2 | 12/2011 | Tsuchida | |
| 8,325,474 B2 | 12/2012 | Spaulding et al. | |
| 8,469,466 B2 | 6/2013 | Gong | |
| 8,508,928 B2 | 8/2013 | Killen et al. | |
| 8,749,966 B1 | 6/2014 | Boudreau et al. | |
| 8,931,748 B2 | 1/2015 | Bowman et al. | |
| 9,513,677 B2 * | 12/2016 | Huang | G06F 1/187 |
| 9,727,099 B1 | 8/2017 | Hastings et al. | |
| 2005/0013108 A1 | 1/2005 | Lee | |
| 2005/0088778 A1 | 4/2005 | Chen et al. | |
| 2005/0214098 A1 | 9/2005 | Franke et al. | |
| 2006/0130083 A1 | 6/2006 | Cheng | |
| 2007/0014085 A1 | 1/2007 | Meserth et al. | |
| 2007/0085419 A1 | 4/2007 | Matsuo | |
| 2007/0153040 A1 | 7/2007 | Park et al. | |
| 2008/0104280 A1 | 5/2008 | Biskeborn | |
| 2008/0165490 A1 | 7/2008 | Buckland et al. | |
| 2009/0273896 A1 | 11/2009 | Walker et al. | |
| 2010/0020438 A1 | 1/2010 | Gross et al. | |
| 2011/0001409 A1 | 1/2011 | Peng et al. | |
| 2011/0109990 A1 | 5/2011 | Fang et al. | |
| 2012/0069514 A1 | 3/2012 | Ross | |
| 2012/0327595 A1 | 12/2012 | Caldwell et al. | |
| 2013/0199295 A1 | 8/2013 | Hoefer et al. | |
| 2014/0016262 A1 | 1/2014 | Lo | |
| 2014/0098481 A1 | 4/2014 | Hartman et al. | |
| 2014/0362515 A1 | 12/2014 | Pronozuk et al. | |
| 2017/0168527 A1 | 6/2017 | Eguchi et al. | |
| 2017/0322604 A1 | 11/2017 | Chen et al. | |

OTHER PUBLICATIONS

Intel® Server System SR2612UR Service Guide http://download.intel.com/support/motherboards/server/s5520ur/sb/r2612ur_service_guide_14.pdf.

Synology DiskStation DS213+ http://www.xtremesystems.org/forums/showthread.php?282802-Synology-DiskStation-DS213.

Compaq, "Compaq Hot Plug Drive Carrier Enhancements", Compaq Technology Brief, Document No. 0225-0699-A, Aug. 1999, 6 pages.

Aearo Technologies, "Data Storage Rotational Vibration Solution", Retrieved at: http://www.earsc.com/applications.asp?id=9&childid=29&parentid=28 on Oct. 30, 2013, 1 page.

* cited by examiner

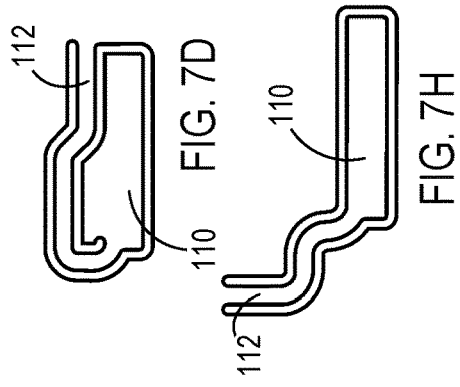
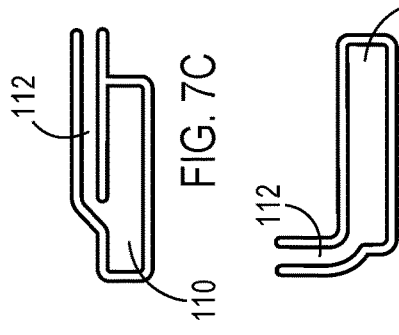
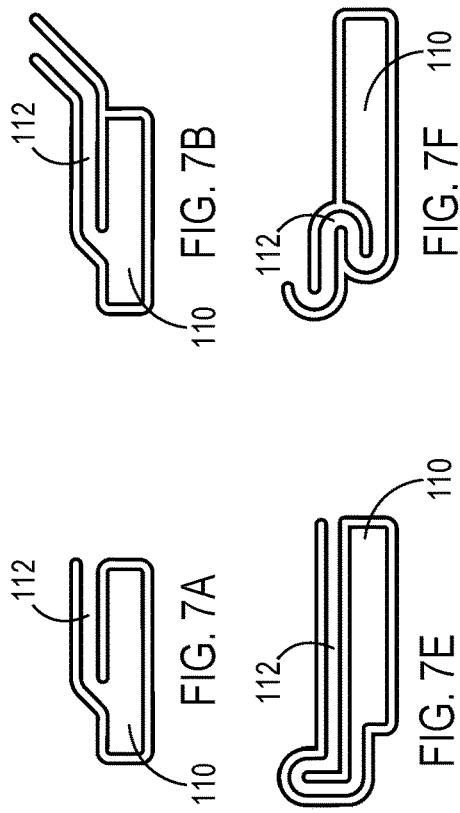
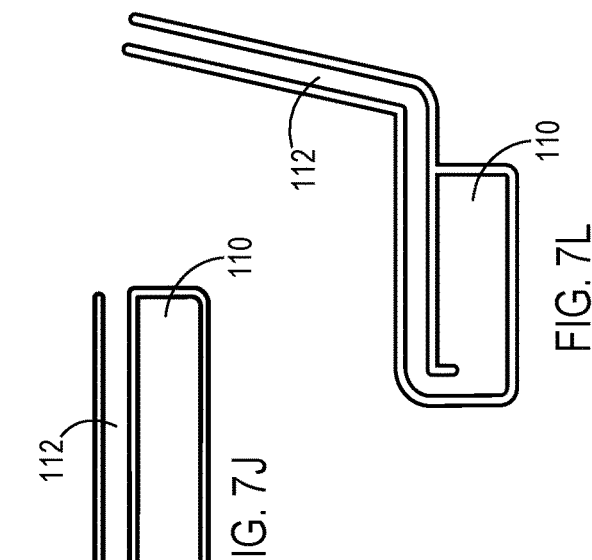
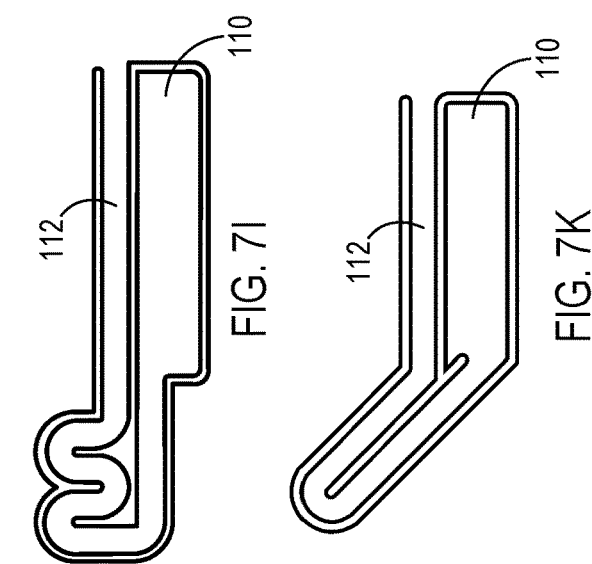

ALTERNATELY SHAPED BACKPLANE FOR RECEIVING ELECTRICAL COMPONENTS

FIELD OF THE INVENTION

Aspects of the disclosure are related to a backplane for receiving electrical components.

BACKGROUND

As computer systems and networks grow in numbers and capability, there is a need for more and more storage system capacity. Cloud computing and large-scale data processing further increase the need for digital data storage systems that are capable of transferring and holding immense amounts of data.

One approach to providing sufficient data storage is the use of arrays of independent hard disk drives. A number of hard disk drives can be held in a container or enclosure. The hard disk drives are held and operated in close proximity within the container, so that many hard disk drives can be fit into a defined volume. Rackmount enclosures can be used to hold very large amounts of data.

Hard disk drives include spinning disks that are typically rotated at high speeds, such as a speed of 7,200 RPM, for example. A read head is moved inward or outward from the center of the spinning disks in order to read and write data on the disk. These moving components can generate vibrations in the hard disk drive. Hard disk drives include traditional hard disk drives and hybrid drives (combination of traditional rotating storage and solid-state storage).

When a number of hard disk drives are included within a container, the vibrations generated by one hard disk drive can be transferred to other hard disk drives within the container. Additionally, vibrations external to the container may also be transferred to the hard disk drives. The transferred vibrations can interfere with operations of the affected hard disk drive or hard disk drives. The transferred vibrations can cause decreased performance or possible damage to components of the hard disk drive.

Overview

An apparatus comprising a backplane configured to receive electrical components is provided. In one example, an apparatus comprising a backplane configured to receive electrical components, the backplane comprising a substrate comprising an at least partially flexible material and a connector island assembly formed in the substrate. The connector island assembly comprises a spring element having a spring element width and a spring element length orthogonal to and longer than the spring element width and comprises a connector island having a connector island width and a connector island length longer than the connector island width. The spring element extends from a main portion of the substrate at a first end of the spring element along a first direction toward a second end of the spring element, and the first direction is parallel to a spring element central axis extending along the spring element length. The connector island extends from the second end of the spring element at a first end of the connector island along a second direction parallel to the connector island length toward a second end of the connector island, and the second direction is orthogonal to the first direction and parallel to a connector island central axis extending along the connector island length. The connector island assembly is surrounded by the main portion of the substrate and configured to flex independently of the main portion of the substrate.

In another example, a system is included for isolating electrical component vibrations, the system comprising a substrate comprising an at least partially flexible material; a plurality of spring elements formed in the substrate and connected to a main portion of the substrate, wherein the main portion of the substrate extends along a substrate plane; a plurality of connector islands formed in the substrate, wherein each connector island is connected to the main portion of the substrate via a single, respective spring element of the plurality of spring elements; a chassis member positioned adjacently to a first side of the substrate; and a travel limiter assembly comprising a plurality of connector elements extending from a travel limiter frame. Each connector element of the plurality of connector elements is coupled to the chassis member and extends from the chassis member through a respective void in the substrate from the first side of the substrate to the travel limiter frame positioned adjacently to a second side of the substrate. The travel limiter frame is separated from the second side of the substrate by a travel gap. The travel limiter frame is configured to contact a respective connector island of the plurality of connector islands in response to at least a portion of the respective connector island coming into contact with the travel limiter frame due to flexure of the respective spring element connected to the respective connector island.

In another example, a method of manufacturing a backplane assembly is included, the method comprising forming a connector island assembly in a backplane, which comprises: forming a spring element in a substrate of the backplane and forming a connector island in the substrate. The spring element is separated from a main portion of the substrate and comprises: a spring element width; a spring element length orthogonal to and exceeding the spring element width and extending parallel to a spring element central axis; a first end of the spring element connected to the main portion of the substrate; and a second end of the spring element opposite the first end of the spring element along the spring element length. The connector island is separated from the main portion of the substrate and connected to the main portion of the substrate via the spring element. The connector island comprises: a connector island width; a connector island length orthogonal to and exceeding the connector island width and extending parallel to a connector island central axis orthogonal to the spring element central axis; a first end of the connector island connected to the second end of the spring element; and a second end of the connector island opposite the first end of the connector island along the connector island length. The connector island assembly is surrounded by the main portion of the substrate and configured to flex independently of the main portion of the substrate.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

FIGS. 7A-7L illustrate alternative connector island assembly embodiments according to an implementation.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
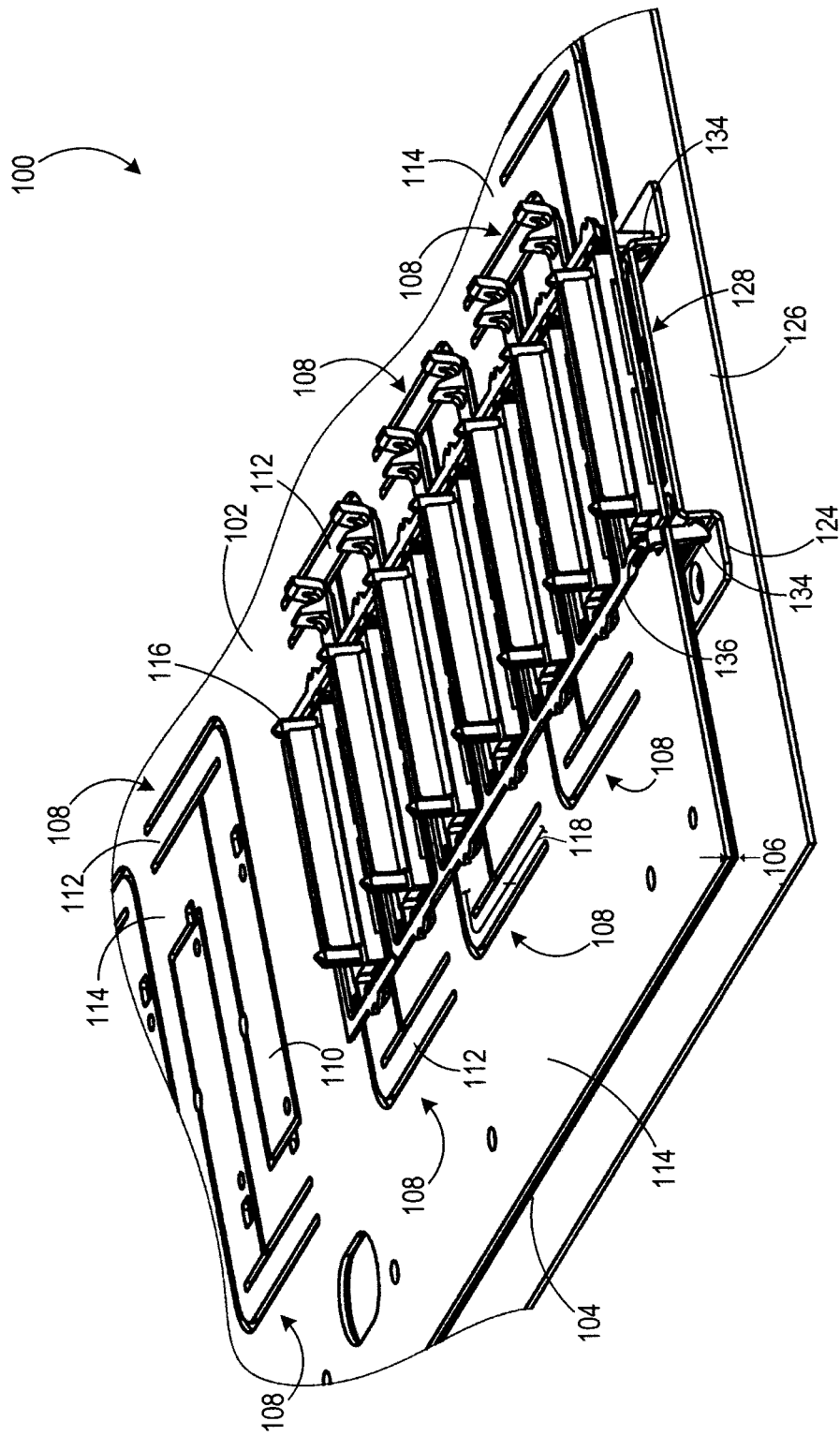
FIG. 1 shows a portion of an exemplary vibration reduction system according to an implementation.
Figure 2:
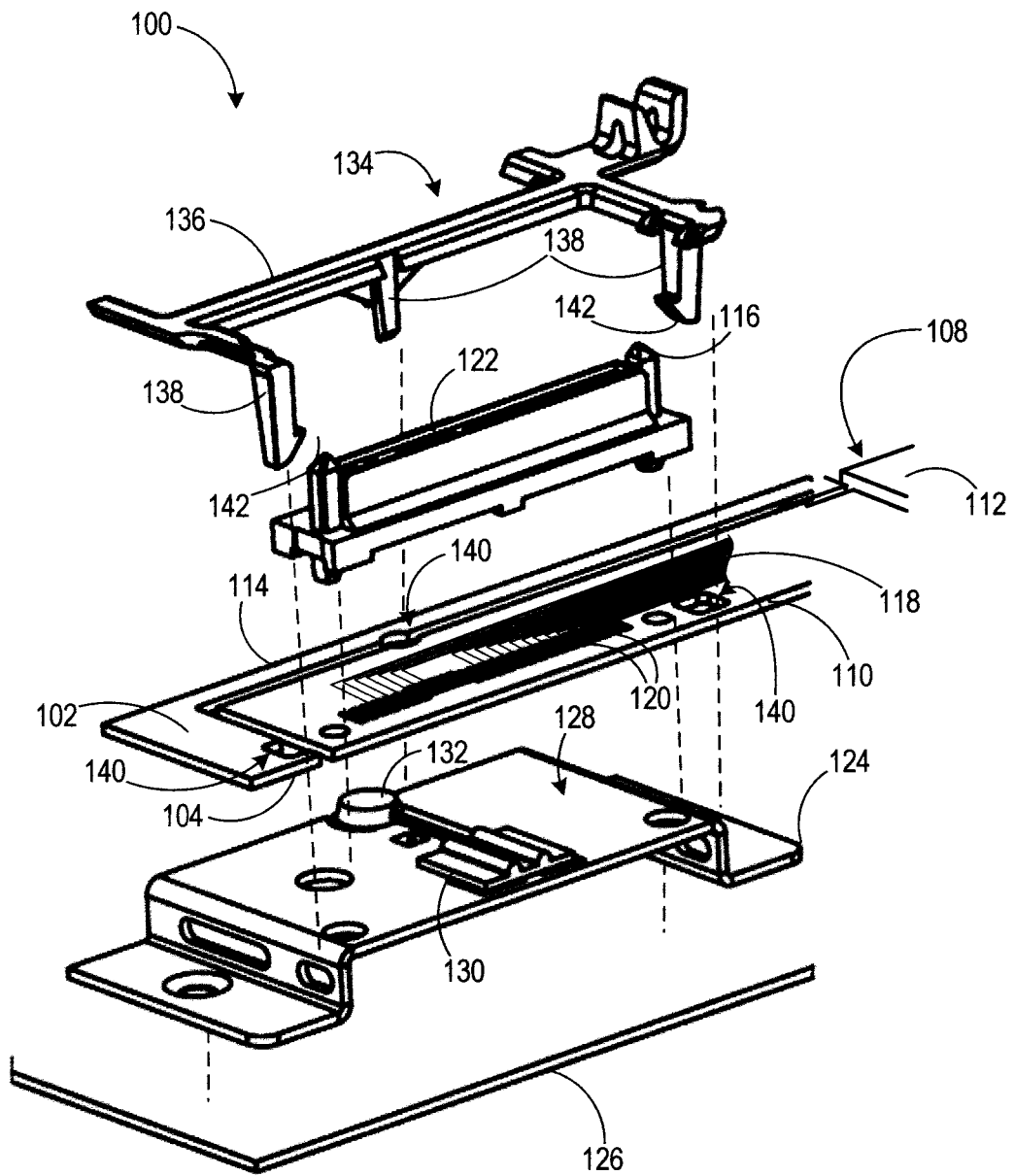
FIG. 2 illustrates an exploded view of the vibration reduction system of FIG. 1 according to an implementation.

FIG. 1 shows an isometric view of a portion of an exemplary vibration reduction system 100. FIG. 2 illustrates an exploded view of a portion of the vibration reduction system 100. Referring to both FIGS. 1 and 2, the vibration reduction system 100 comprises a backplane 102 for receiving and coupling to a plurality of electrical components, including a plurality of identical electrical components in some examples. The backplane 102 in some examples is configured to receive multiple rows and columns of electrical components. In one example, the plurality of electrical components comprises a plurality of hard disk drives (HDDs) that couple to an assembled and completed backplane 102. However, other or additional electrical components are contemplated and are within the scope of the description and claims.

The backplane 102 comprises a substrate 104. The substrate 104 is at least partially flexible, wherein the backplane 102 can be flexed or deformed. The substrate 104 has a thickness 106 and can be formed of any suitable material, including plastics, ceramics, or other material wherein the substrate 104 is at least partially flexible. The substrate 104 in some examples comprises an electrical insulator or dielectric material. The backplane 102 in some examples can comprise a single-sided, double-sided, or multi-layer Printed Circuit Board (PCB).

Backplane 102 includes a plurality of connector island assemblies 108 formed in the substrate 104. Each connector island assembly 108 includes a connector island 110 connected to a spring element 112. Spring element 112 is connected to a main portion 114 of substrate 104 and to the connector island 110, while the connector island 110 is connected only to the spring element 112. The connector island assembly 108 is formed out of the substrate 104 and is configured to be at least partially flexible, which allows the connector island 110 to be displaced up and down or, due to in-plane motion, fore/aft and side-to-side with respect to the substrate 104. In one embodiment, the spring element 112 flexes more than the connector island 110 when the connector island 110 is displaced with respect to the substrate 104. The spring element 112 allows a majority of the vibrations originating from either the main portion 114 or from the connector island 110 to be dissipated based on movement or motion of the connector island 110. Accordingly, the spring element 112 enables the connector island 110 to vibrate while reducing the transmission of connector island vibrations to the substrate 104. Conversely, the spring element 112 allows the substrate 104 to vibrate while reducing the transmission of vibrations from the substrate 104 to the connector island 110. Therefore, the spring element 112 allows the connector island 110 to be at least partially vibrationally isolated from the substrate 104.

Each connector island 110 includes a connector 116 configured to electrically couple with a corresponding mating component. In embodiments of the invention, connector 116 is a HDD connector configured to electrically couple the backplane 102 with a HDD 600 installed thereon (see FIG. 6). Connector 116 can be somewhat inflexible. Thus, when installed on a respective connector island 110, the connector 116 can reduce the ability of the connector island 110 itself to flex. However, there may still be some flexibility of connector island 110 even with a connector 116 attached thereto. With the connector 116 attached, the majority of the displacement of the connector island 110 is typically provided through flexure of the spring element 112.

A plurality of electrical traces 118 extend across spring element 112 to electrically couple connector island 110 with main portion 114 of substrate 104 and beyond as necessary. On the connector island 110, the plurality of electrical traces 118 can terminate at a plurality of connector pads 120 configured to be electrically coupled with corresponding pins or other conductors 122 of connector 116.

Vibration reduction system 100 includes a chassis member 124 such as a stiffener attached to a chassis 126 of a multi-component container. When installed in the multi-component container, backplane 102 is positioned adjacently to chassis member 124. However, backplane 102 may not be in direct contact with chassis member 124. Instead, chassis member 124 may be separated from one side of the backplane 102 by an interstitial gap (see FIG. 4). Within the gap, a connector island vibration isolator 128 is positioned to limit travel of the connector island assemblies 108 toward the chassis member 124. Connector island vibration isolator 128 includes a connector island pad 130 aligned with a respective connector island 110 and a substrate pad 132 aligned with a section of the main portion 114 of the substrate 104. The substrate pad 132 is typically aligned with a main portion section between adjacent connector island assemblies 108. In one embodiment, each connector island vibration isolator 128 is a single piece of material including a connector island pad 130 for each connector island 110 in a group of adjacent connector islands 110 such as the seven neighboring connector islands 110 shown with connectors 116 as illustrated in FIG. 1. Connector island vibration isolator 128 is formed, in one embodiment, of a viscoelastic material with low compressibility and minimizes transference of vibrations from the chassis member 124 to the respective connector island 110. In another embodiment, vibration isolator 128 may be formed from a transfer adhesive positioned between the connector islands 110 and the chassis member 124. The height of the isolator 128 may be optimized to allow a large shear stress to be developed in the isolator 128 to increase modal damping and to limit downward travel of the connector island assemblies 108.

Vibration reduction system 100 includes a travel limiter assembly 134 to limit upward travel of the connector island assemblies 108. Travel limiter assembly 134 includes a travel limiter frame 136 from which a plurality of travel limiter connector elements 138 extend. The travel limiter frame 136 is positioned adjacently to the other side of the backplane 102 opposite the chassis member 124, and the travel limiter connector element 138 extend from the travel limiter frame 136 through voids 140 in the substrate 104 to attach to chassis member 124. Void 140 are sufficiently large enough to allow travel limiter connector elements 138 to pass through without contacting either main portion 114 of substrate 104 or any of the connector island assemblies 108 when they are not flexed. That is, when the connector islands 110 are not displaced due to flexure of any part of the connector island assemblies 108, the travel limiter connector elements 138 do not contact the connector islands 110. In one embodiment, to keep the travel limiter assembly 134 in place in response to deformation contact by at least one of the connector islands 110, multiple travel limiter connector elements 138 of the travel limiter assembly 134 contain barbs or hooks 142 at an end thereof. The hook 142 counters an upward force exerted on the travel limiter assembly 134 because of displacement or flexure of the connector island assembly 108. In another embodiment, a plurality of stand-offs with related fastening hardware may be fastened to and extend from the chassis member 124 or other fixed body to the travel limiter frame 136 through voids 140 to keep the travel limiter assembly 134 in place.

Figure 3:
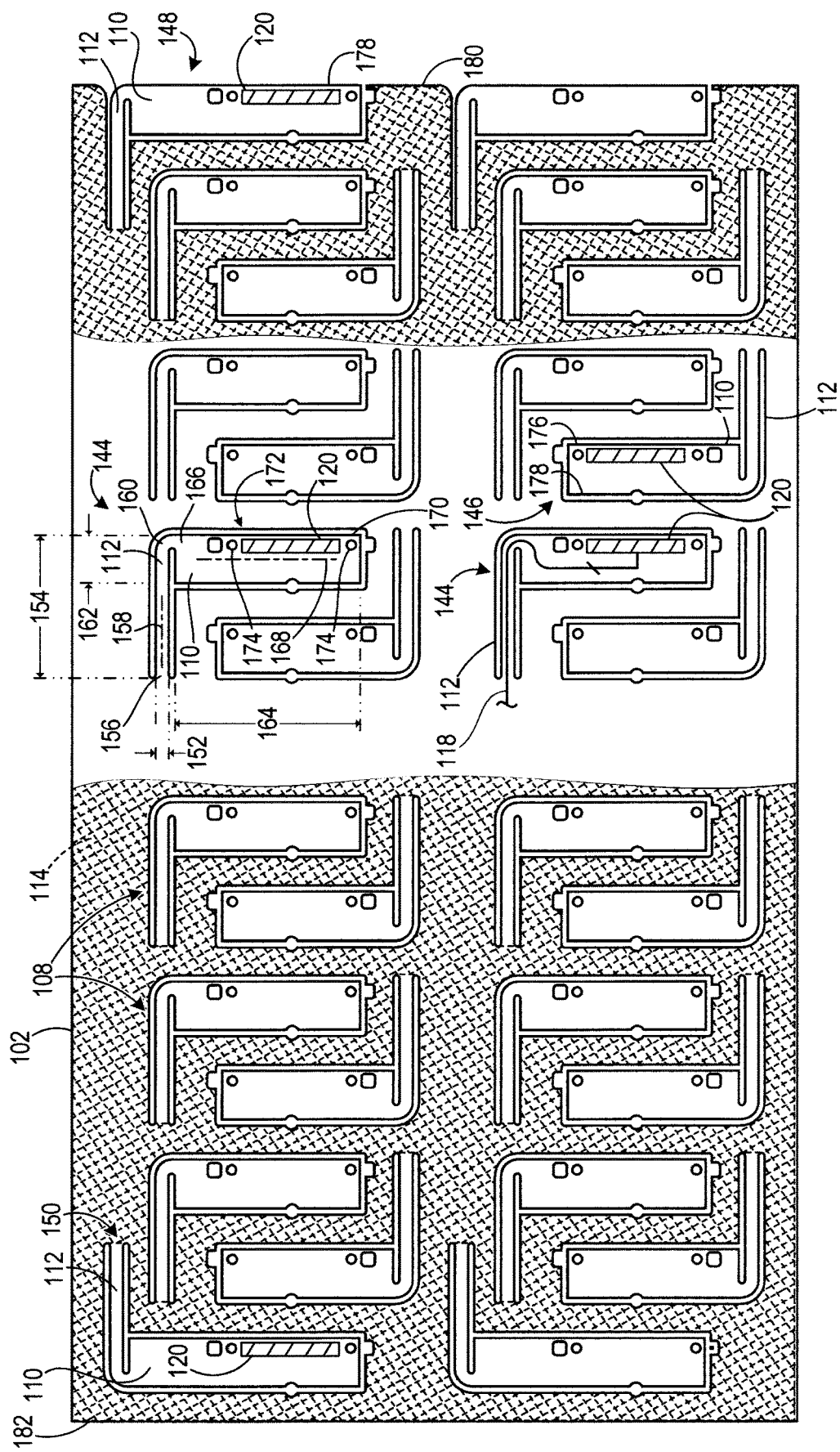
FIG. 3 illustrates a top plan view of the backplane of FIG. 1 according to an implementation.

FIG. 3 illustrates a top plan view of the backplane of FIG. 1 according to an implementation. A plurality of connector island assemblies 108 are shown and discussed in more detail with respect to FIG. 3.

In the implementation shown, twenty-eight connector island assemblies 108 are shown in groups of seven arranged in two columns and two rows. It is understood that other arrangements of connector island assembly 108 placements are also contemplated herein such as a different number of columns and/or rows and also in groups of more or less than seven. FIG. 3 illustrates four distinct types of connector island assemblies 108, referred to hereinbelow as connector island assemblies 144-150. Each connector island assembly 144-150 includes a corresponding connector island 110 and spring element 112 connecting the connector island 110 to main portion 114 of substrate 104. Main portion 114 is illustrated as a cross-hatch in only two portions of substrate 104 in FIG. 3 to simplify the drawing, but it is understood that main portion 114 equally applies to similar areas in the remaining portions of substrate 104.

Referring to connector island assembly 144, spring element 112 has a spring element width 152 and a spring element length 154. Spring element 112 extends from main portion 114 of the substrate 104 at a first end 156 of the spring element 112 along a first direction parallel to a spring element central axis 158 extending along the spring element length 154 toward a second end 160 of the spring element 112. Connector island 110 has a connector island width 162 and a connector island length 164. Connector island 110 extends from the second end 160 of the spring element 112 at a first end 166 of the connector island 110 along a second direction parallel to a connector island central axis 168 extending along the connector island length 164 toward a second end 170 of the connector island 110. First and second directions are orthogonal in one embodiment. The connector island length 164 is longer than the spring element length 154, and the connector island width 162 is longer than the spring element width 152.

Connector island assembly 144 is separated from substrate 104 via one or more cutouts 172 in the substrate 104. In the case of connector island assembly 144, a single or continuous cutout in substrate 104 defines its connector island 110 and spring element 112.

Voids 140 in the substrate 104 and connector island 110 allow the travel limiter connector elements 138 to pass through from one side of the backplane 102 to the opposite side. In addition, one or more connector holes 174 may be formed in connector island 110 to allow connector 116 to be coupled thereto. Connector pads 120 are illustrated between connector holes 174 for an embodiment of connector 116 requiring such a configuration. However, other configurations corresponding with the connector layout of the component designed to be coupled with connector island assembly 144 are also contemplated herein.

As illustrated in the lower illustration of connector island assembly 144, electrical traces 118 are integrally formed in the substrate 104 and electrically connect the main portion 114 of the substrate 104 to the electrical connector pads 120 along at least a portion of the spring element 112 and along at least a portion of the connector island 110.

Aspects of the connector island assemblies 146-150 are similar to the description of connector island assembly 144 above. However, a few distinctions are now described. With respect to connector island assembly 146, a difference between that described with respect to connector island assembly 144 and connector island assembly 146 includes placement of the voids 140, connector holes 174, and connector pads 120 on an opposite side of the connector island 110 compared with that of the connector island 110 of connector island assembly 144. That is, as illustrated, the voids 140, connector holes 174, and connector pads 120 of connector island assembly 146 are positioned on a side of the connector island 110 closer to the first end 156 of the spring element 112. Accordingly, the placement position of these elements may be considered to be closer to an "inside" edge 176 of the connector island 110 than to an "outside" edge 178. In addition, the connector island length 164 of connector island assembly 146 is shorter than the connector island length 164 of connector island assembly 144 in the embodiment shown, while the connector island length 164 of connector island assembly 146 still remains longer than the spring element length 154 of connector island assembly 146 as with the connector island assembly 144. In another embodiment, the connector island length 164 of connector island assembly 146 may be the same as or longer than the connector island length 164 of connector island assembly 144.

With respect to connector island assembly 148, connector island assembly 148 is formed near an edge 180 of the substrate 104, with the edge 180 forming the outside edge 178 of connector island assembly 148 after cutting connector island assembly 148 out. Furthermore, connector island assembly 148 is formed outside of a connector island assembly 144, requiring the connector island length 164 of connector island assembly 148 to be longer than the connector island length 164 of connector island assembly 144 in order to align the connector pads 120 with the other connector pads 120 in the grid row. Similar to connector island assembly 144, placement of the voids 140, connector holes 174, and connector pads 120 is on the outside edge 178.

With respect to connector island assembly 150, connector island assembly 150 is also formed near an edge 182 of substrate 104. However, unlike connector island assembly 148, edge 182 extends beyond the outside edge 178 of connector island assembly 150 in the embodiment shown. Similar to connector island assembly 146, placement of the voids 140, connector holes 174, and connector pads 120 is on the inside edge 176.

While connector island assembly 148 is shown to form an edge of backplane 102 and connector island assembly 150 is shown to be formed away from the edge 182 of backplane 102, embodiments of the invention contemplate edge 180 of backplane 102 extending beyond the outside edge 178 of connector island assembly 148 while the outside edge 178 of connector island assembly 150 may be formed out of the edge 182 of backplane 102.

As illustrated in the left portion of FIG. 3, main portion 114 of substrate 104 completely surrounds connector island assemblies 144, 146 and 150. However, since connector island assembly 148 is formed at an edge of the main portion 114 of substrate 104, main portion 114 only borders a portion of its connector island 110 and spring element 112. Formation of connector island assemblies 144-150 as described herein allow each to be flexibly independent of the main portion 114 of substrate 104 and of each other.

Figure 4:
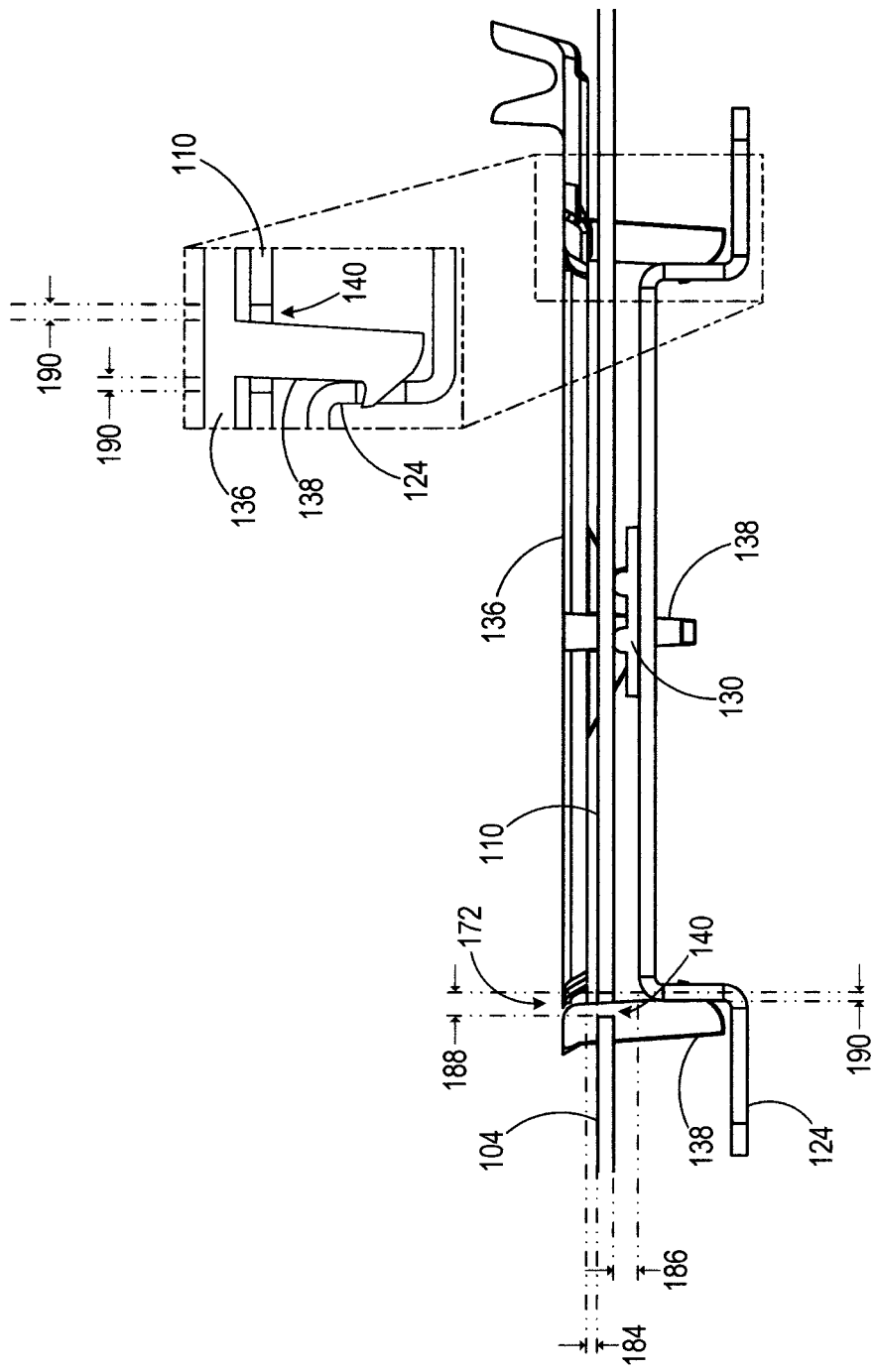
FIG. 4 illustrates a side plan view of the vibration reduction system of FIG. 1 according to an implementation.
Figure 5:
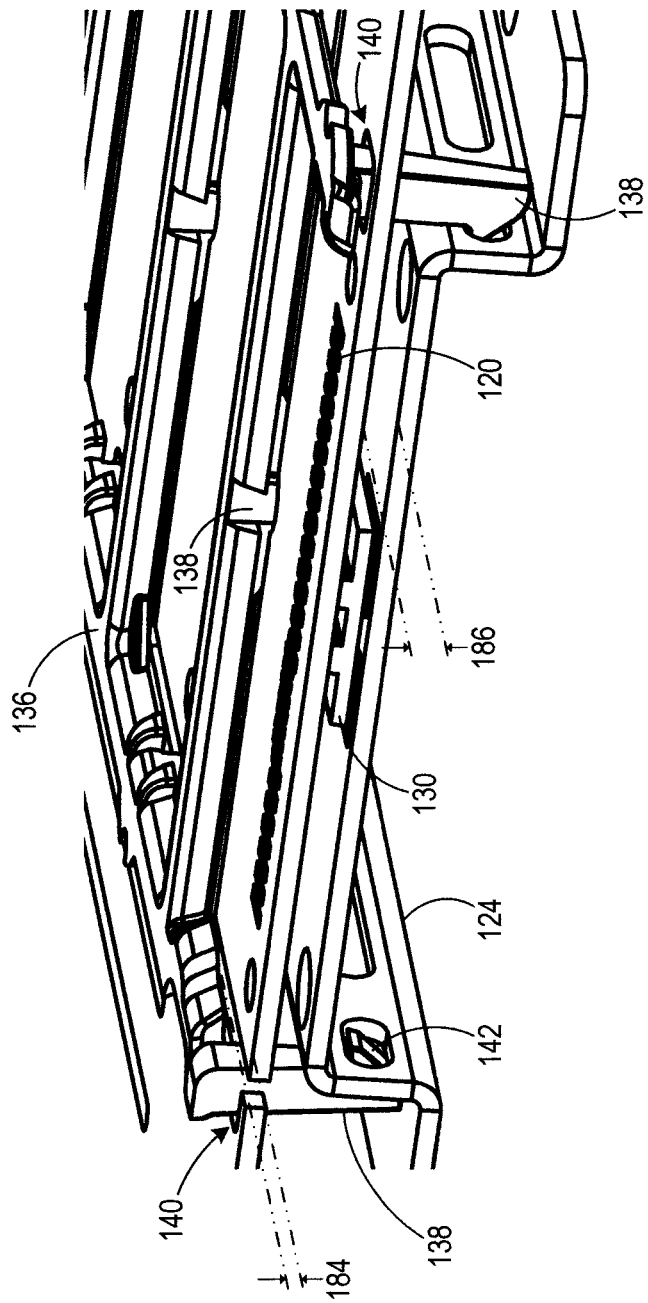
FIG. 5 illustrates an isometric view of the vibration reduction system of FIG. 1 according to an implementation.

FIGS. 4 and 5 show side plan and isometric views of a portion of the vibration reduction system 100 of FIG. 1. As illustrated, travel limiter assembly 134 is installed with travel limiter connector elements 138 extending through backplane 102 to couple with chassis member 124. Travel limiter frame 136 is thus positioned adjacently to one side of the substrate 102 while the chassis member 124 is positioned adjacently on the other side. Travel limiter frame 136 is separated from the side of the substrate 104 by a travel gap 184. In an unflexed and/or an undisplaced state, connector island 110 is designed to be separated from the travel limiter frame 136 by the travel gap 184. However, as connector island 110 is displaced or flexed in an upward direction, the gap between at least a portion of the connector island 110 (e.g., a left-most end of connector island 110 as illustrated in FIG. 4), and the travel limiter frame 136 is reduced. The connector island 110 may be sufficiently displaced or flexed so as to traverse the travel gap 184 to come into at least partial contact with travel limiter frame 136. Travel limiter frame 136, however, remains coupled with chassis member 124 in response to such contact and in response to additional forces that would, without restraint from travel limiter frame 136, cause connector island 110 to deflect farther. Thus, travel limiter frame 136 limits the upward travel or displacement of connector island 110 to the distance of travel gap 184. Thus, the travel limiter frame 136 is configured to contact a member of the connector island assembly 108 only in response to at least a portion of the connector island assembly 108 coming into contact with the travel limiter frame 136 due to flexure or displacement of either or both of the spring element 112 and the connector island 110 of the connector island assembly 108.

An interstitial gap 186 between chassis member 124 and backplane 102 provides a space to position connector island vibration isolator 128 to limit downward displacement of connector island 110 as described above. Cutout 172 separates second end 170 of connector island 110 by a cutout gap 188 sufficient to allow adequate displacement/flexure of connector island 110 to reduce transmission of vibrations as discussed herein. Voids 140 allow placement of travel limiter connector element 138 therethrough sufficient to provide a gap 190 so that upward displacement/flexure of connector island 110 does not cause connector island 110 to contact the travel limiter connector elements 138. In addition, gap 190 may also be of sufficient size to prevent contact between the connector island 110 and the travel limiter connector elements 138 due to in-plane motion of the connector island 110 (i.e., fore/aft or side-to-side motion) and to allow vibration isolator 128 to dissipate motion of the connector island 110 via in-plane shear.

Figure 6:
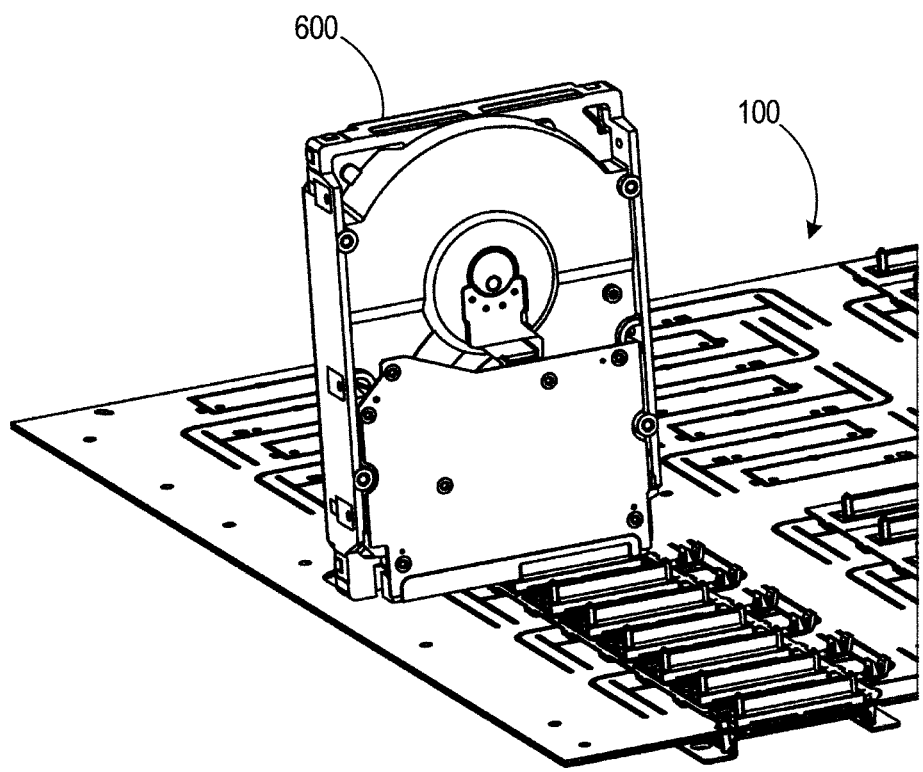
FIG. 6 illustrates the vibration reduction system of FIG. 1 with an example mating electrical component assembled thereon according to an implementation.

FIG. 6 illustrates the vibration reduction system 100 including a HDD 600 installed thereon. To simplify the figure, only a single HDD 600 is illustrated. However, it is understood that in a complete system, a respective HDD 600 would be installed in each position defined by the placement of the connectors 116.

FIGS. 7A-7L illustrate alternative connector island assembly embodiments according to an implementation. Each connector island assembly includes a respective connector island 110 connected to a spring element 112. In some embodiments, the connector islands 110 are similarly sized; however, the spring elements 112 of each of the embodiments illustrated in FIGS. 7A-7L are unique. Embodiments of the backplane 102 described above may employ one or more of the connector island assemblies in addition to or instead of the connector island assembly 108 discussed in FIGS. 1-6.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

The invention claimed is:

1. An apparatus comprising a backplane configured to receive electrical components, the backplane comprising:
   a substrate comprising an at least partially flexible material; and
   a connector island assembly formed in the substrate and comprising:
      a spring element having a spring element width and a spring element length orthogonal to and longer than the spring element width; and
      a connector island having a connector island width and a connector island length longer than the connector island width;
   wherein:
      the spring element extends from a main portion of the substrate at a first end of the spring element along a first direction toward a second end of the spring element;
      the first direction is parallel to a spring element central axis extending along the spring element length;
      the connector island extends from the second end of the spring element at a first end of the connector island along a second direction parallel to the connector island length toward a second end of the connector island; and
      the second direction is orthogonal to the first direction and parallel to a connector island central axis extending along the connector island length; and
   wherein the connector island assembly is:
      surrounded by the main portion of the substrate; and
      configured to flex independently of the main portion of the substrate.

2. The apparatus of claim 1, wherein the connector island length exceeds the spring element length.

3. The apparatus of claim 1, wherein the connector island width exceeds the spring element width.

4. The apparatus of claim 1, wherein the connector island assembly is formed in the substrate via a cutout formed in the substrate.

5. The apparatus of claim 1, further comprising an electrical connector coupled to the connector island.

6. The apparatus of claim 5, further comprising an electrical trace integrally formed in the substrate and electrically connecting the main portion of the substrate to the electrical connector along at least a portion of the spring element and along at least a portion of the connector island.

7. The apparatus of claim 1, further comprising a travel limiter positioned adjacently to the connector island assembly and separated from the connector island assembly by a gap distance;
wherein the travel limiter is configured to limit a deflection distance of the connector island assembly as a result of the connector island assembly being displaced toward the travel limiter by the gap distance.

8. A system for isolating electrical component vibrations, the system comprising:
a substrate comprising an at least partially flexible material;
a plurality of spring elements formed in the substrate and connected to a main portion of the substrate, wherein the main portion of the substrate extends along a substrate plane;
a plurality of connector islands formed in the substrate, wherein each connector island is connected to the main portion of the substrate via a single, respective spring element of the plurality of spring elements;
a chassis member positioned adjacently to a first side of the substrate; and
a travel limiter assembly comprising a plurality of connector elements extending from a travel limiter frame;
wherein:
each connector element of the plurality of connector elements is coupled to the chassis member and extends from the chassis member through a respective void in the substrate from the first side of the substrate to the travel limiter frame positioned adjacently to a second side of the substrate;
the travel limiter frame is separated from the second side of the substrate by a travel gap; and
the travel limiter frame is configured to contact a respective connector island of the plurality of connector islands in response to at least a portion of the respective connector island coming into contact with the travel limiter frame due to flexure of the respective spring element connected to the respective connector island.

9. The system of claim 8, further comprising a plurality of connector island vibration isolators, wherein a connector island vibration isolator of the plurality of connector island vibration isolators is:
positioned between the chassis member and a respective connector island of the plurality of connector islands; and
configured to limit travel of the respective connector island toward the chassis member.

10. The system of claim 9, wherein the connector island vibration isolator is formed of a viscoelastic material.

11. The system of claim 8, wherein a connector element of the plurality of connector elements extends through the substrate without contacting the main portion of the substrate and without contacting an adjacent, undisplaced connector island of the plurality of connector islands.

12. The system of claim 8, wherein a connector element of the plurality of connector elements comprises a hook configured to couple the connector element to the chassis member.

13. The system of claim 8, wherein:
a spring element of the plurality of spring elements extends from the main portion of the substrate at a first end of the spring element along a first direction toward a second end of the spring element;
the first direction is parallel to a spring element central axis extending along a length of the spring element;
a connector island of the plurality of connector islands extends from the second end of the spring element at a first end of the connector island along a second direction toward a second end of the connector island; and
the second direction is orthogonal to the first direction and parallel to a connector island central axis extending along a length of the connector island.

14. The system of claim 8, further comprising an electrical connector coupled to a connector island of the plurality of connector islands.

15. The system of claim 14, wherein the electrical connector is configured to mate with a hard drive connector.

16. A system for manufacturing a backplane assembly, the system comprising:
means for forming a connector island assembly in a backplane, the forming comprising:
forming a spring element in a substrate of the backplane, wherein the spring element is separated from a main portion of the substrate and comprises:
a spring element width;
a spring element length orthogonal to and exceeding the spring element width and extending parallel to a spring element central axis;
a first end of the spring element connected to the main portion of the substrate; and
a second end of the spring element opposite the first end of the spring element along the spring element length;
forming a connector island in the substrate, wherein the connector island is separated from the main portion of the substrate and connected to the main portion of the substrate via the spring element, wherein the connector island comprises:
a connector island width;
a connector island length orthogonal to and exceeding the connector island width and extending parallel to a connector island central axis orthogonal to the spring element central axis;
a first end of the connector island connected to the second end of the spring element; and
a second end of the connector island opposite the first end of the connector island along the connector island length;
wherein the connector island assembly is:
surrounded by the main portion of the substrate; and
configured to flex independently of the main portion of the substrate.

17. The system of claim 16, further comprising:
means for positioning the backplane adjacently to a chassis member; and
means for coupling a travel limiter assembly to the chassis member;
wherein:
the travel limiter assembly comprises a connector element extending from a travel limiter frame;

the connector element is coupled to the chassis member and extends from the chassis member through a void in the substrate from a first side of the substrate to a second side of the substrate;

the travel limiter frame is positioned adjacently to the second side of the substrate and is separated from the second side of the substrate by a travel gap; and the travel limiter frame is configured to contact the connector island assembly in response to at least a portion of the connector island assembly coming into contact with the travel limiter frame due to flexure of at least the spring element of the connector island assembly.

18. The system of claim 17, further comprising:

means for positioning a connector island vibration isolator assembly between the chassis member and the substrate;

wherein the connector island vibration isolator assembly comprises a viscoelastic connector island vibration isolator for the connector island.

19. The system of claim 16, further comprising:

means for forming the connector island assembly via a continuous cutout within the substrate.

20. The system of claim 16, further comprising:

means for forming additional connector island assemblies by forming each connector island assembly of a first set of connector island assemblies within an interior portion of the substrate, wherein the main portion of the substrate encircles each connector island assembly of the first set of connector island assemblies; and means for forming each connector island assembly of a second set of connector island assemblies adjacently to an edge of the substrate, wherein the main portion of the substrate fails to encircle each connector island assembly of the second set of connector island assemblies.

* * * * *